United States Patent [19]

Rinder

[11] Patent Number: 5,086,891
[45] Date of Patent: Feb. 11, 1992

[54] SINGLE PEDAL VEHICLE BRAKING AND ACCELERATION CONTROL SYSTEM

[76] Inventor: Herbert R. Rinder, 525 W. Stratford, Apt. 374, Chicago, Ill. 60657

[21] Appl. No.: 582,657

[22] Filed: Aug. 29, 1990

[51] Int. Cl.$^5$ .............................................. F02D 9/06
[52] U.S. Cl. ................... 192/1.56; 192/1.57; 192/1.62
[58] Field of Search .............. 192/1.36, 1.52, 1.56, 192/1.57, 1.63

[56] References Cited

U.S. PATENT DOCUMENTS

| | | | |
|---|---|---|---|
| 1,513,587 | 10/1924 | Davis | 192/1.56 |
| 1,608,809 | 11/1926 | Quintenz | 192/1.57 |
| 1,774,836 | 9/1930 | Lormüller | 192/1.4 |
| 1,804,615 | 5/1931 | Hinds | 192/1.56 X |
| 2,162,183 | 6/1939 | Smith | 192/1.56 |
| 2,222,379 | 11/1940 | Smith | 192/1.4 |
| 2,778,463 | 1/1957 | Rook | 192/1.56 |
| 3,059,416 | 10/1962 | Campbell | 192/1.64 X |

FOREIGN PATENT DOCUMENTS

| | | | |
|---|---|---|---|
| 828631 | 1/1952 | Fed. Rep. of Germany | 192/1.57 |
| 58-12836 | 1/1983 | Japan | 192/1.57 |
| 141724 | 12/1930 | Switzerland | 192/1.52 |
| 2104463 | 3/1983 | United Kingdom | 192/1.57 |

Primary Examiner—Allan D. Herrmann
Assistant Examiner—Nicholas Whitelaw
Attorney, Agent, or Firm—Dvorak and Traub

[57] ABSTRACT

A mechanism for a single pedal control of both the brake and acceleration systems of automotive vehicles comprising a pedal, a tension-producing assembly, a pedal vertical positioner, and a coupling device for applying pressure to a piston of a vehicle master cylinder. The pressure applied by the coupling device to the piston is correlated with the vertical elevation of the pedal. The pedal, through a coupling device, applies maximum braking to a vehicle when no pressure is exerted on the pedal. Lesser amounts of braking are applied to the vehicle as the driver's foot presses the pedal downwards. At a point where the pedal contacts the accelerator rod, there is zero braking of the vehicle, and the braking of the vehicle remains at zero thereafter as the accelerator rod is further depressed to change the speed of the vehicle. To maintain a constant speed, the accelerator rod is held at a constant elevation by the pressure of the driver's foot on the pedal. To slow down or to stop, the driver needs only to appropriately reduce his foot pressure on the pedal.

2 Claims, 1 Drawing Sheet

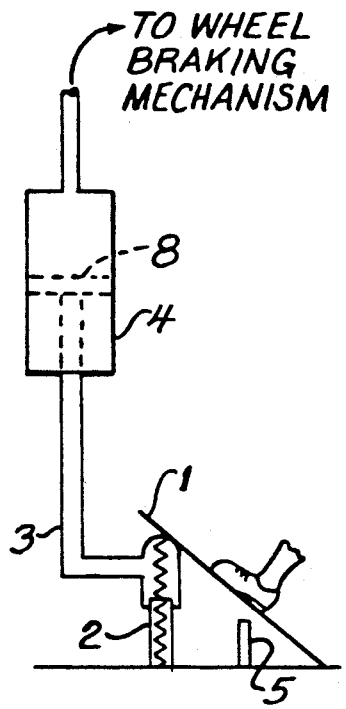
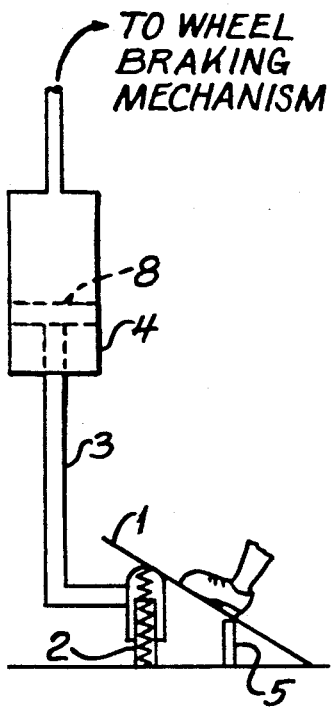
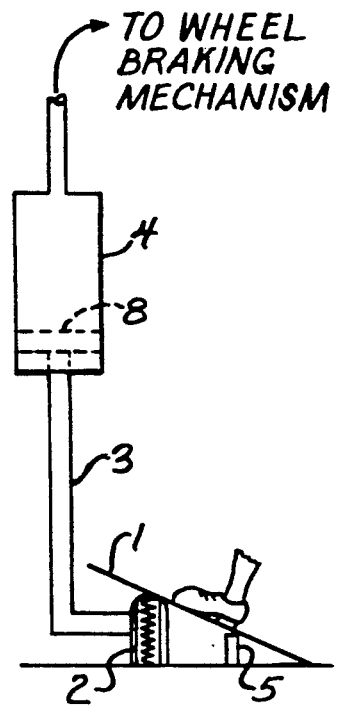
FIG. 1    FIG. 3    FIG. 4
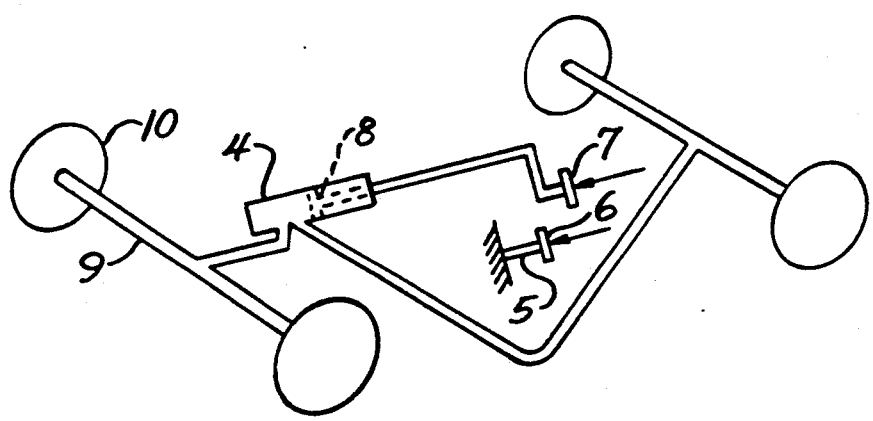
FIG. 2
PRIOR ART

SINGLE PEDAL VEHICLE BRAKING AND ACCELERATION CONTROL SYSTEM

BACKGROUND—FIELD OF INVENTION

This invention relates to the brake and acceleration systems of automotive vehicles, and more specifically, to the means whereby the operation of these systems may be controlled by a single pedal rather than by the operation of two independent pedals, the brake pedal and the accelerator pedal, as now required.

BACKGROUND—DESCRIPTION OF PRIOR ART

Heretofore, automotive vehicles required the movement of the driver's foot from the accelerator pedal to the brake pedal of a vehicle in order to slow down or to stop the vehicle when in motion. This induced a lapse of time from the moment when the driver decided to slow down or to stop the vehicle to the moment when the brake system was actually employed to effect the change in the speed of the vehicle. Thus, the vehicle moved a certain distance during this dead time before the desired change in vehicle speed was effected, which sometimes posed a hazard to the occupants of the vehicle, or to others, or to property.

SUMMARY OF THE INVENTION

The object of the invention is to eliminate the delay between the time a driver decides to slow down or to stop his vehicle and the time when the person actually activates the brake system. This delay, which heretofore has been caused by the required transferring of the driver's foot from the accelerator pedal to the brake pedal, is eliminated by the invention.

The invention controls the braking and accelerating of the vehicle by the movement of a single pedal, which controls both the acceleration and brake mechanisms of the vehicle. Thus, the necessity of transferring the driver's foot from one pedal to another is avoided, eliminating the undesired time delay in applying the brakes.

The advantage of the invention over the prior art is tremendous in its potential for eliminating injuries, fatalities and property damage, which may be caused by the time delay in moving the driver's foot from the accelerator pedal to the brake pedal at times when an emergency slowdown or stopping is necessitated by various conditions that may occur from time to time.

The invention also has the advantage of automatically braking a vehicle in which a driver has fallen asleep and allowed his foot to reduce the required pressure to maintain vehicle speed, as well as automatically braking a vehicle in which the driver has suddenly had a heart attack or other disabling affliction.

BRIEF DESCRIPTION OF THE DRAWINGS

FIG. 1 is a schematic view of the present invention in the maximum braking, zero acceleration mode.

FIG. 2 is a schematic view of a prior art, conventional two-pedal acceleration/braking system.

FIG. 3 is a schematic view of the present invention in a zero braking, intermediate acceleration mode.

FIG. 4 is a schematic view of the present invention in a zero braking, high acceleration mode.

DESCRIPTION OF THE PREFERRED EMBODIMENT

FIG. 1 shows the mechanism of the invention according to the preferred embodiment of the invention. The mechanism comprises a pedal 1, which is used to engage both the brake and acceleration systems of an automotive vehicle.

The said pedal is enabled to engage both said systems by:

(1) means of a tension producing element, the coil spring assembly 2, which is used to supply tension to the said pedal to maintain it in its vertical position, and which positions said pedal to its maximum vertical position when no pressure is applied to it by the driver's foot; and (2) by means of a device, an arm 3, which couples the mechanism's vertical movement to the piston 8 of master cylinder 4 of an automotive vehicle's brake system.

One end of the said arm is attached to the spring coil assembly in such a manner so that it moves in a vertical downward or upward direction, respectively, as the spring assembly is compressed or relaxed by the action of the pedal. The other end of the arm is connected to the piston of the master cylinder. The arm applies variable pressure to the piston of the master cylinder in accordance with the vertical motion of the pedal, thus, causing variable braking of the vehicle corresponding to the vertical elevation of the pedal.

FIG. 2 shows the heretofore operation of a typical automotive vehicle's brake and acceleration systems. When accelerating the vehicle, the driver engages the accelerator rod 5 by pressing down on the accelerator pedal 6 with his foot. When slowing down or stopping, the driver moves his foot to the brake pedal 7. The brake pedal is attached to a mechanism that applies pressure to a piston 8 in the master cylinder 4 when the driver's foot presses down on the brake pedal.

When pressure is applied to the master cylinder 4, brake fluid is forced out of the master cylinder and into the brake lines 9, which carry the fluid to the wheels' braking mechanisms 10, causing the vehicle to slow down or to stop.

FIG. 1 shows the operation of the invention when the driver's foot is not applying pressure to the pedal 1, so that said pedal is forced into its maximum vertical upward position by the coil spring assembly 2. With the pedal in this position, maximum force is applied to the piston 8 in the master cylinder 4, resulting in maximum braking power being applied to the wheels' braking mechanisms.

FIG. 3 shows the operation of the invention as the driver's foot applies pressure to the pedal 1, compressing the spring coil assembly 2 and forcing the arm 3 to move vertically downwards, thereby reducing the force being applied to the piston 8 in the master cylinder 4 and, thus, decreasing the braking pressure being applied to the wheels' braking mechanisms, resulting in a reduced braking effect on the vehicle. At the point where the pedal contacts the accelerator rod 5 there is zero breaking of the vehicle, and the braking of the vehicle remains at zero thereafter as the accelerator rod is further depressed.

FIG. 4 shows the operation of the invention as the pedal 1 is pushed further and further downwards by the driver's foot. After contact with the accelerator rod 5, the braking applied to the vehicle is zero and the speed of the vehicle is increased to a maximum as the pedal is depressed to its full range of downward movement. To maintain a constant speed, the accelerator rod is held at a constant elevation by the pressure of the driver's foot on the pedal. To slow down or to stop, the driver needs only to release the pressure on the pedal until the desired braking of the vehicle is effected.

Thus, it can be seen that the mechanism of the invention provides a unique, simple method for providing the braking and acceleration of automotive vehicles heretofore not exploited, whereby the driver needs only to move his foot vertically up or down to effect a desired change in vehicle's movement, rather than having to move his foot to a second pedal.

The invention provides increased ease of operation of automotive vehicles and greatly increases the safety of said vehicles. It would substantially reduce the number of fatalities, injuries to humans and animals, and property damage, caused heretofore by the problem stated above. Reduced insurance rates would be an additional benefit, as well as the savings of millions of dollars in liability and property claims.

The parts comprising the invention may be affixed to a vehicle in any appropriate manner to effect the desired result of controlling the brake and acceleration systems of a automotive vehicle by means of a single pedal. The invention may be embodied in any number of physical arrangements of parts, and may consist of parts other than those described herein, which accomplish the same result of controlling the acceleration and brake systems of automotive vehicles by means of a single pedal.

Those skilled in the art will envision many other possible variations within the scope of the invention. For example, a master cylinder of a vehicle may be mounted in a horizontal position requiring a different kind of coupling system to connect it to the mechanism comprising the invention. Or, a different type of device might be used to supply tension to the pedal of the invention.

Therefore, the scope of the invention should not be construed as being limited by the parts or their configuration as shown in FIG. 1, which merely is an exemplification of the preferred embodiment of the invention. Accordingly, the scope of the invention should be determined by the appended claims and their legal equivalents, and not by any examples given herein.

I claim:

1. A single pedal vehicle braking and acceleration control system, comprising:
    a fluid-driven friction brake system having a brake actuator,
    an acceleration system having an acceleration actuator,
    a pivotable single pedal arranged and constructed to simultaneously contact and directly act upon said brake actuator and said acceleration actuator,
    a resilient means opposing downward movement of said single pedal, said resilient means arranged and constructed to automatically apply force to said brake actuator to engage the braking system, whereby, upon downward movement of said single pedal, the acceleration system is engaged while the braking system is simultaneously disengaged, and upon release of said single pedal, the acceleration system is disengaged while the braking system is simultaneously engaged.

2. A single pedal vehicle braking and acceleration control system according to claim 1, wherein said resilient means comprises a coil spring.

* * * * *